Oct. 3, 1933.  J. H. MOFFAT  1,928,946
MEANS FOR PARKING SELF PROPELLED VEHICLES
Filed Dec. 28, 1931  3 Sheets-Sheet 1

Inventor
JOHN H. MOFFAT
By
Owen H. Spencer
Attorney

Oct. 3, 1933.  J. H. MOFFAT  1,928,946
MEANS FOR PARKING SELF PROPELLED VEHICLES
Filed Dec. 28, 1931  3 Sheets-Sheet 2
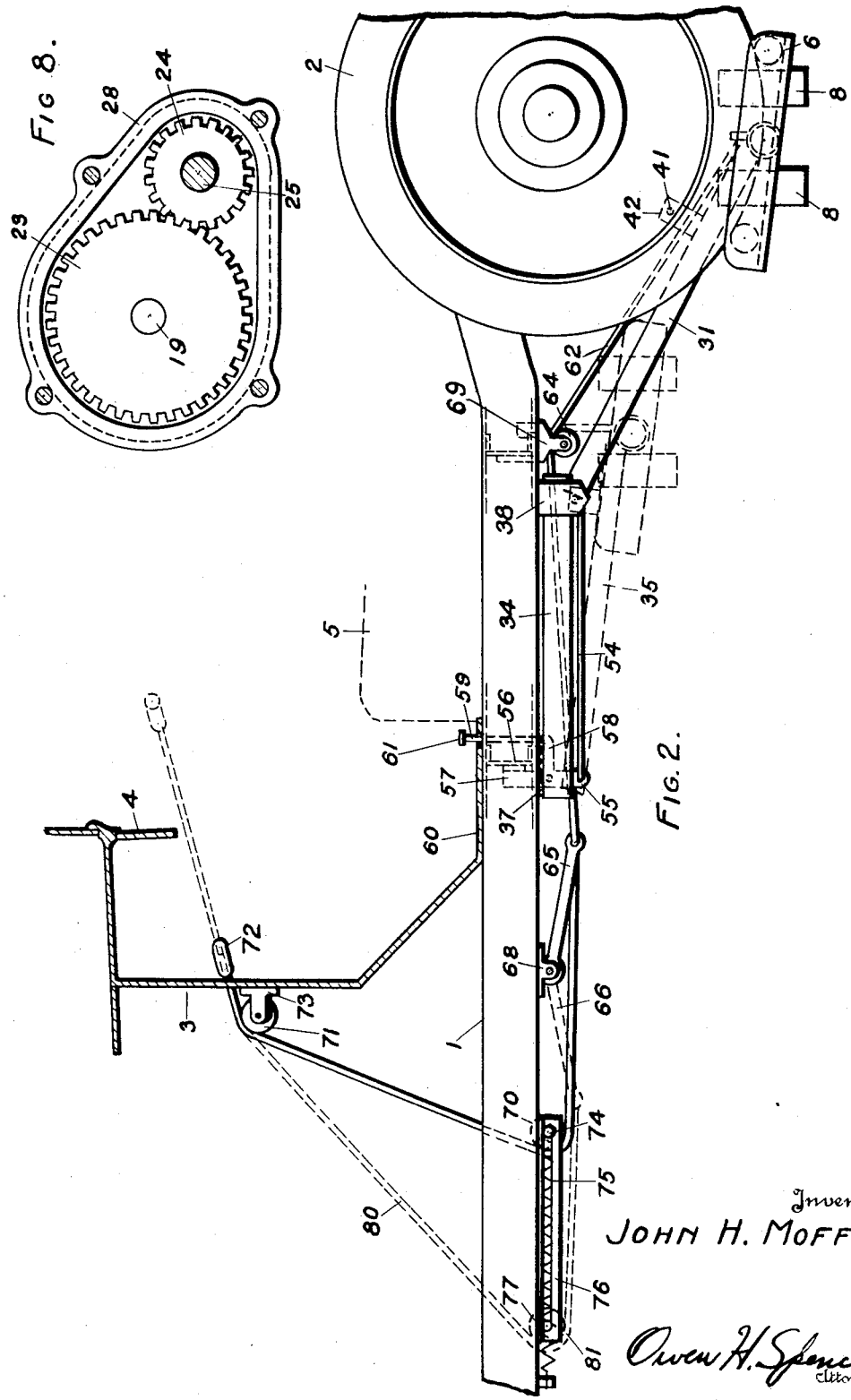
Inventor
JOHN H. MOFFAT Oct. 3, 1933.　　　　J. H. MOFFAT　　　　1,928,946
MEANS FOR PARKING SELF PROPELLED VEHICLES
Filed Dec. 28, 1931　　　3 Sheets-Sheet 3
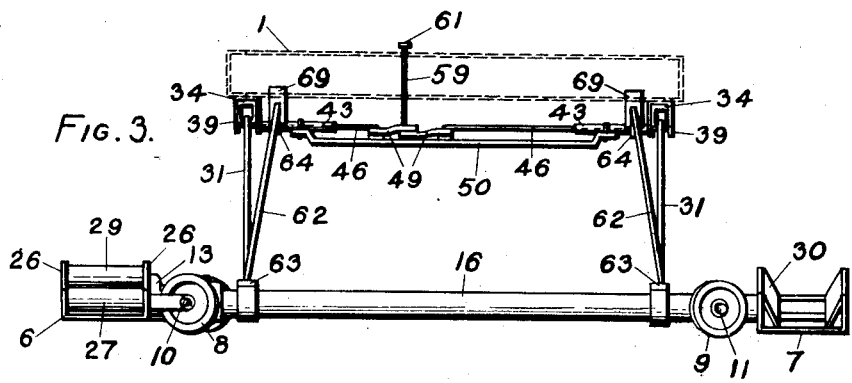
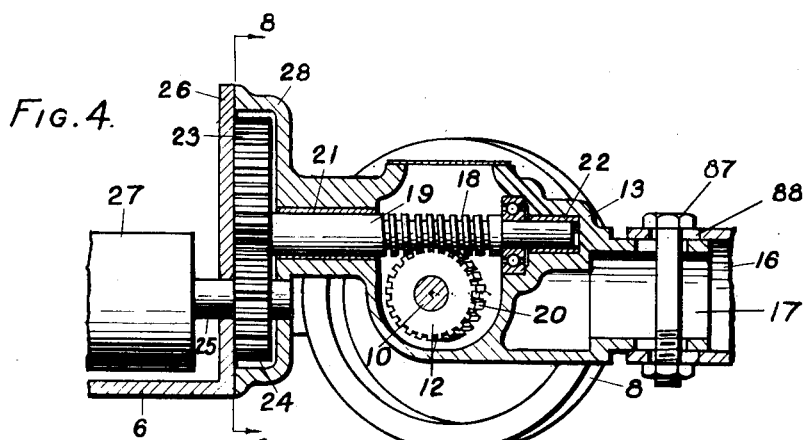
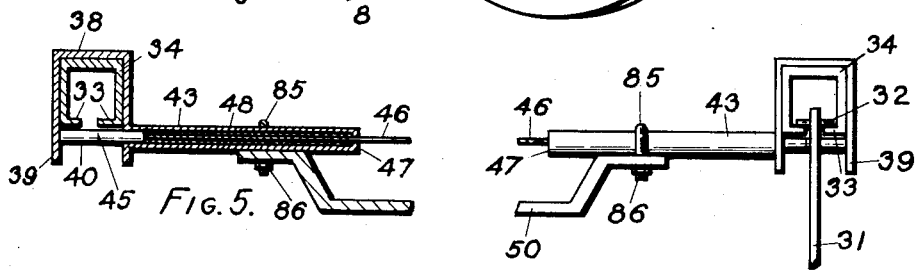
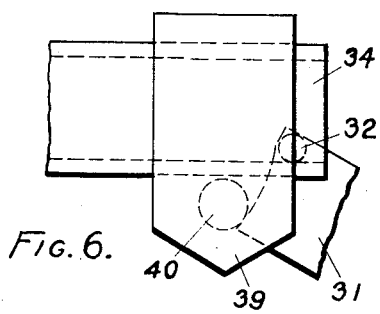
Inventor
JOHN H. MOFFAT
By Owen H. Spencer
Attorney Patented Oct. 3, 1933

1,928,946

UNITED STATES PATENT OFFICE 1,928,946

MEANS FOR PARKING SELF-PROPELLED VEHICLES

John H. Moffat, Indianapolis, Ind.

Application December 28, 1931
Serial No. 583,594

5 Claims. (Cl. 180—1)

My invention relates to means for parking self-propelled vehicles, and more particularly to truck means which serve to be introduced as and when required beneath the rear wheels of an automobile for shifting same laterally, and operated by frictional contact with the vehicle wheels at points of support on the truck means; and consists substantially in the construction, combination and arrangement of parts hereinafter set forth and pointed out more particularly in the claims.

An object of the invention is to provide a mechanism for utilizing the driving power of the propulsion motor of the vehicle for imparting rotating motion to the wheels of the trunk means as desired.

It is also an object to provide means for attaching the major part of the apparatus to and carrying same below the vehicle proper by which its presence is made negligible, substantially including the mechanism to shift the truck means from a position more directly under the vehicle proper to a working position under the vehicle wheels, and vice-versa.

It is a further object to provide a trigger means which releases the truck mechanism from idle position, and means to instantly and automatically direct same to working position when the trigger means is operated, said trigger means also automatically retaining the truck mechanism in working position.

It is a further object to provide the truck mechanisms, trigger means, and truck controlling means in dual arrangement, all of which are manipulated concurrently from single levers.

It is also an object to provide a pair of truck mechanisms, united by a plain elongated member, and a gear housing embodied with one end of said member to enclose gearing which transmits rotary motion from the vehicle wheel to the wheels of the adjacent truck mechanism.

Another object is to provide a pair of truck mechanisms, united by a plain elongated member, and positioning tongues for said member attached removably to same.

It is a further object to provide guides for the free ends of said tongues, each of said guides having a single deengageable stop which properly restricts the movement of the truck mechanism both in idle and working positions.

It is also an object to provide a roller which one of the vehicle wheels contacts and rotates for driving the respective truck mechanism, the axial center of said roller having a less working height than the axial centers of the wheels of the truck mechanisms.

It is a further object to provide a driving axle for the truck wheels, a spur gear concentrically mounted on said axle, said gear having teeth parallel to said axle and a driving worm in meshed relation with said gear, said axle being at an angle to the axial center of said worm, and the angular pitch of said worm being co-incident to the angle of the axial center of the worm whereby the worm is properly meshed with said spur gear.

The above and other objects are attained by the structure illustrated in the accompanying drawings, in which:

Fig. 2 is a somewhat enlarged fragmentary side elevation of Fig. 1;

Fig. 3 is a rear elevational view of Fig. 2, corresponding in scale to Fig. 1;

Fig. 4 is a sectional view taken in the proximity of line 4—4, of Fig. 1;

Fig. 5 is a cross sectional view taken in the proximity of line 5—5, of Fig. 1;

Fig. 6 is an enlarged fragmentary view of a portion of Fig. 2;

Fig. 7 is an enlarged sectional view taken in the proximity of line 7—7, of Fig. 1 and;

Fig. 8 is a sectional view taken in the proximity of line 8—8 of Fig. 4.

Figure 1:
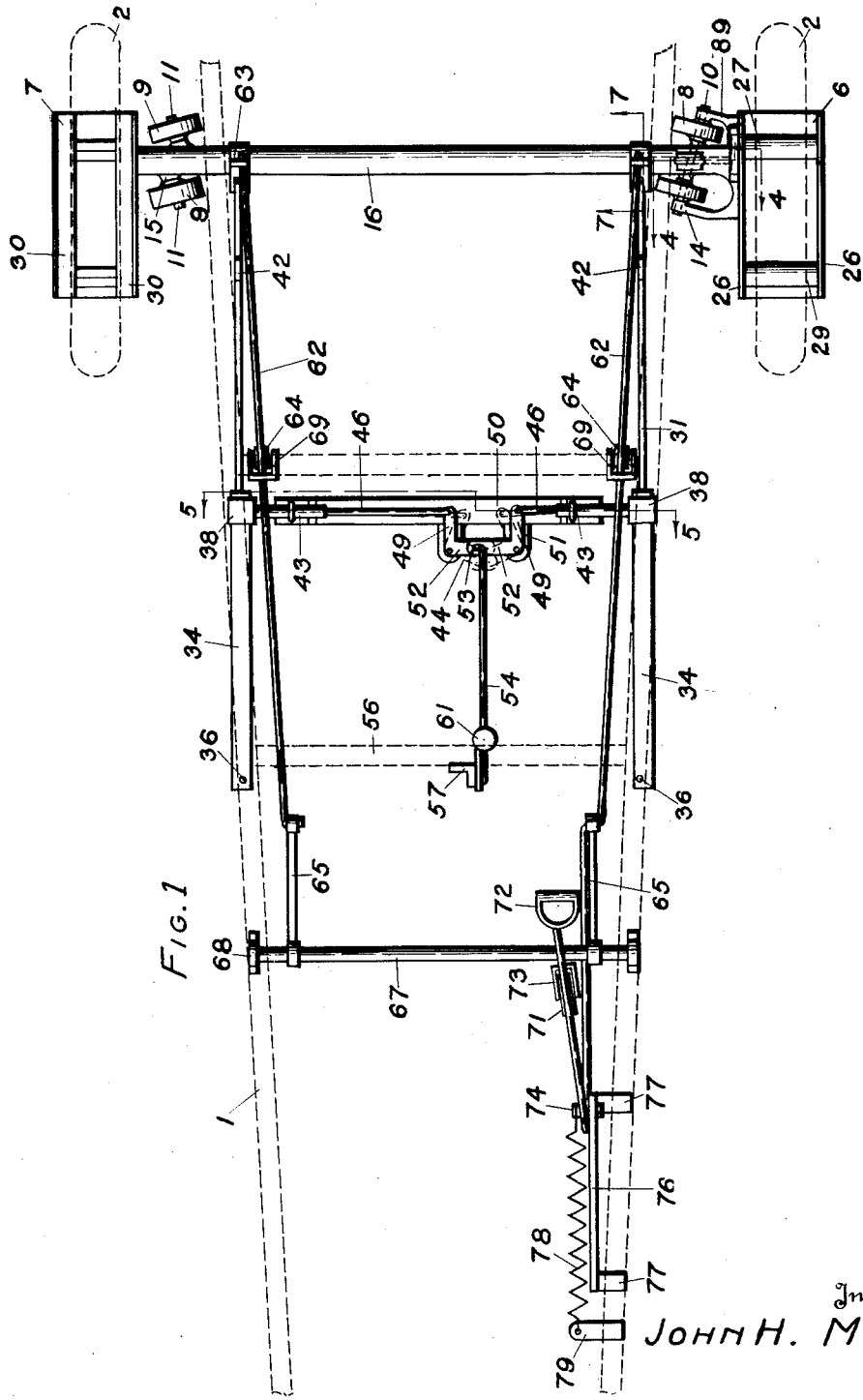
Figure 1 is a fragmentary diagrammatic plan view of an automobile chassis with which the invention is embodied, the chassis members being indicated by dotted lines.

Similar characters of reference designate similar parts throughout the several views. Referring more particularly to Fig. 1, the dotted lines designated by numeral 1 indicate the side rails of the automobile chassis to which this example of the invention is installed, and numeral 2 designates the usual rear propulsion wheels of the automobile. Referring to Fig. 2, the numeral 3 designates the conventional auto cowl board and numeral 4, the instrument board. The dotted lines 5 indicate the position of the forward portion of the operator's seat.

The invention includes two channel like runways 6 and 7, which serve to receive the two automobile rear wheels 2, said runways being spaced apart in accordance with the distance between the said driving wheels. Each of said runways is provided with a pair of supporting truck wheels 8 and 9, and axles 10 and 11, the truck wheels 8 being secured on the axle 10 upon which is concentrically mounted an ordinary spur gear 12, conveniently between the truck wheels 8 within the housing 13, said axle 10 being journaled on each side of said spur gear by journals 14. The truck wheels 9 are similarly axled to the frame 15 which serves similarly in this respect to housing 13, the spur gear 12 being omitted. The frame 15 and housing 13 are conveniently united by a piece of standard tubing 16, said housing having a pilot 17 rigidly engaged within the end of said tubing, and said tubing being integrally united with the frame 15. The axles 10 and 11 are angularly disposed to the tubing 16, said axles trending inwardly at their forward ends.

A gear worm 18 is journaled in the housing 13 being formed on the shaft 19 which is disposed co-directionally with the tubing 16. Said worm meshes with the spur gear 12, the angle of the axle 10, in relation to the axial center of the worm 18, being equal to the angular pitch of said worm by which arrangement, the ordinary spur gear 12 having teeth 20 parallel to the axial center thereof, is correctly meshed with said worm. The shaft 19 has journals 21 and 22, one each side of the worm 18, said journals being embodied with the housing 13. Upon the outer end of the shaft 19 and beyond the journal 21, the spur gear 23 is concentrically secured and meshes with a smaller mating spur gear 24 which is concentrically mounted on the inner end of the roller shaft 25 which journals through the two side walls 26 of the runway 6, and also thru a wall of the housing 13, or the opposite side of the gear 24, the automobile supporting roller 27 being concentrically mounted by said shaft between said side walls, the inner one of said side walls forming a removable covering for the casing 28 of said housing which is provided therewith to enclose the spur gears 23 and 24, by which arrangement a means is provided for assembling and removing said gears from said housing, as well as for securing the runway 6 to said housing.

The idler roller 29 is pivoted between the side walls 26, forwardly of the roller 27, the respective automobile rear wheel 2 resting on both of said rollers when the runways are in working position. It will be understood that the rotary force transmitted to said driving wheel by automobile propelling means (not shown) revolves the roller 29 idly and drives the truck wheels 8 by the roller 27, through the shaft 25, the gear 24, the gear 23, the shaft 19, the worm 18, the spur gear 12, and the axle 10 to which the said truck wheels 8 are secured. The truck wheels thus serve to carry the rear end of the automobile sideways on the runways 6 and 7, along on floor, road or street surface, into correct parked position as will be understood and likewise carried from parked position.

The runway 7 is provided with trough forming side walls 30 which locate the respective automobile wheel laterally when supported by said runway 7, centralizing the automobile wheel supported by the runway 6. The automobile driving wheel supported by the runway 7 is thus suitably held therein against rotation by supporting contact with same, its being understood that the conventional differential automobile axle gearing (not shown) permits the rotation of one of the automobile rear wheels without rotating the other.

Referring to Fig. 8, it will be noted that the spur gear 24, is located about the center of the spur gear 23 somewhat to the rear and to a point below the center of spur gear 23, to bring the center of the spur gear 24, and of the roller 27 to less height than the center of the axle 10. It will thus be seen that while rotary power is imparted to the upper portion of the spur gear 12, by the worm 18, by the arrangement of the various gears and shafts, a mechanism is produced in which the center of the power receiving roller 27 is of less height than the center of the truck wheels 8 and 9.

Truck positioning tongues 31 are removably and somewhat flexibly secured to the tubing 16, as will be explained, and extend forwardly and upwardly at right angles therefrom. The forward ends of said tongues are intersected and supported by horizontally disposed pins 32 the overhanging portions of which are supported by the underlapping flanges 33 of tracks 34 which are suspended directly under and parallel to the chassis side rails 1.

When the runways 6 and 7, and tongues 31 are shifted from working position to idle position as indicated by the dotted lines 35 in Fig. 2, the pins 32 slide along on the flanges 33 to the forward ends of the tracks. Said tracks are secured to the side rails 1 at their forward ends by the bolts 36 being spaced therefrom by the washers 37, and at their rearward ends by yokes 38, the closed ends of which attach to said side rails and the extremities 39 of which straddle said tracks and extend below same.

The tongues 31 are retained both in working and idle positions by the plungers 40 which are transversely arranged to said tongues and are slidably disposed thru the inner yoke extremities 39 at points below said tracks whereby said plungers serve to be slid thru said inner extremities against the other ones which thus serve as stops for same as will be understood. When the runways 6 and 7 are in working position, the plungers 40 are disposed across the forward ends of the tongues as shown in Fig. 2 and Fig. 6 and thus serve to lock said tongues and runways in said position. When the tongues and runways are in idle position said plungers are disposed thru the openings 41 of the lugs 42 which extend integrally and upwardly from said tongues at points in the length of same suitable to thus be engaged by said plungers when said tongues are in idle position.

The plunger guide sleeves 43 are integrally secured to the inner ones of the yoke extremities 39 and extend inwardly therefrom, said sleeves being adapted to assist in guiding the plungers 40, from engaged to withdrawn position as more especially indicated by dotted lines 44 in Fig. 1 and dotted lines 45 in Fig. 5. The plunger operating stems 46 are concentrically united with the inner ends of said plungers and extend inwardly therefrom beyond the sleeves 43, thru concentric openings in the heads 47 which close the inner ends of said sleeves. The expansion coil springs 48 are disposed about the stems 46, within said sleeves and are tensioned between said heads and said plungers to normally retain same in locking position, against the outer extremities 39 of yokes 38.

As best shown in Fig. 1, the stems 46 flexibly engage the free ends of the bell cranks 49 which are pivoted forwardly therefrom to the sleeve connecting strut 50, which will be described later on, by the brackets 51. The power receiving arms 52 of said bell cranks extend inwardly from said brackets, overlapping each other, each being provided with one of the two registering holes 53 thru which the operating rod 54 is hooked, and disposed forwardly therefrom. The said holes 53 are elongated with the length of said power receiving arms by which arrangement each may be swung upon its pivot with freedom of the engaging portion of the rod 54.

The forward end of the operating rod 54 is flexibly coupled with the lower end of the lever 55, the upper end of said lever being pivoted in this example of the invention to the front side of the chassis across channel 56 by pivot bracket 57, said lever being pivoted for forward and rearward movement. An arm 58 is secured to said lever and extends rearwardly and below said cross channel. The lever push rod 59 is pivoted to said arm and extends upwardly therefrom thru the automobile flooring 60, the push button 61, being mounted on the upper extremity of said rod above said flooring.

From the foregoing, it will be understood that the operator may permit shifting of the runways 6 and 7, from idle to working position, by using his or her foot to force the button 61, downwardly by which the plungers 40 are withdrawn from engagement with the rear holes 41 of the lugs 42 said plungers being actuated by said button thru the push rod 59, the lever arm 58, the lever 55, the operating rod 54, the arms 52, the bell cranks 49, the plunger stems 46, in opposition to the plunger retaining springs, 48.

As before mentioned the forward ends of the tongues 31 are supported by the pins 32 in the tracks 34. When the runways 6 and 7 are in idle position, said runways together with the rearward ends of the tongues 31, and the parts sundry thereto, has been lifted by the cables 62 which attach to the tubing 16 by brackets 63, said cables extending upwardly and over the pulleys 64 from the rear and thence to the free ends of toggle arms 65, said toggle arms being in the positions indicated by dotted lines 66 of Fig. 2. Said toggle arms are pivoted by the cross shaft 67 being integrally secured thereon and spaced to positions near the ends thereof. The extreme ends of said shaft are journaled to the under surfaces of the side channels 1 by the inverted bearing blocks 68. The pulleys 64 are likewise journaled to the chassis by the pivot blocks 69.

One of the cables 62, extends from the free end of the respective toggle arm 65, forwardly and under the pulley 70, partly around same and in upwardly extending and somewhat rearward position, to the forward portion of the pulley 71 and thence more rearwardly thru the cowl board 3, the end thereof being secured to the hand grasp 72. The pulley 71 is conveniently pivoted to the forward surface of said cowl board by the pivot block 73.

The runways are elevated to idle position as indicated in Fig. 2 by pulling rearwardly on the hand grasp 72, the cable attached thereto being thus operated over the respective pulley 64, the pulley 70, and the pulley 71. When the runways are being thus elevated the plungers 40 are withdrawn from the tongues 31, by operation of the push button 61. Each of the cables are likewise operated by the respective toggle arm 65 both toggle arms being swung in unison with the shaft 67.

The pulley 70 is pivoted by the bolt 74 which loosely engages the horizontal slot 75 of the bracket 76, said brackets being secured to the lower surface of the adjacent side rail 1, by ears 77, formed on said bracket, said slot being substantially parallel with the side rails. Said bolt is connected with the contraction coil spring 78 which stretches forwardly therefrom to engagement with the brackets 79 which is also secured to said adjacent side rail. When the runways are elevated by the cables as described the hand grasp 72 and the adjoining portion of the cable are approximately in a position indicated by the dotted lines 80 in Fig. 2, the plungers 40 are released to engage the lugs 42 by removing the foot pressure from the bottom 61. The runways being retained in idle position, the manual tension on the hand grasp is gradually released, the slack in the cable being taken up by the spring 78, which shifts the pulley 70 forwardly together with the bolt 74 to the forward end of the slot 75, as indicated by the dotted lines 81, of Fig. 2.

Serious difficulty and loss of time is often experienced in parking an automobile with its side to the curb as required in congested street areas, due to the fact that other cars are often likewise parked both forwardly and rearwardly of the space in which parking or removing an automobile is desired, such space in many instances being scarcely sufficient to permit driving and backing the car into parked position by the zig-zagging methods usually employed. An automobile equipped with this invention may be readily headed into a limited parking space the truck wheels 8 and 9 serving to immediately shift the rearward portion of the car to the curb. When an automobile is to be parked, for example, side to the curb, between two other automobiles, the front end is headed angularily toward the curb, and within a foot or two of the desired front end location, the operator presses the button 61 with his foot which thus acts as trigger in releasing the tongues 31, tubing 16, runways 6 and 7, etc. from retention by the plungers 40, and permitting same to instantly fall in the path of the rear automobile wheels 2. The automobile is still moving forwardly and said rear wheels run up into said runways, and the roller 27, being rotated by the respective rear wheel drives the runways laterally toward the curb on the truck wheels 8 and 9, it being understood that when said respective wheel runs up into the runway 6, over said roller, the first contact with the roller by the wheel starts rotation of same, so that there is no hesitation between the usual forward movement of the automobile and the lateral shifting of same to the curb.

In removing from parked position, the automobile reverse mechanism is used to rotate the vehicle wheel supported by the runway 6 in the opposite direction, the roller 27 being thus oppositely rotated to drive the truck wheels from the curb and the rear end of the automobile is thus carried in the runways to an angular position from the curb, sufficient to clear the automobile parked to the rear at which instant the push button 61 is operated to withdraw the plungers 40, from across the forward ends of the tongues 31, and the automobile wheels immediately back off of the runways, and the hand grasp 72 is concurrently used to elevate the runways by the cables 62 into idle position, the plungers 40 being then released to engage the lugs 42. It is understood that said cables may be thus used to influence the movement of the automobile rearwardly to free the runways of the automobile wheels more readily when desired.

When the runways are dropped for use the pulley 70 is drawn rearwardly, the spring 78 yielding to permit paying out of the cables. It is also understood that said spring to some extent counteracts the weight of tongues, runways, etc. making same easier to elevate.

As shown by Fig. 7 and Fig. 1, each of the tongues are hinged to a pair of lugs 82 and between same, by the pins 83, which engage said tongues and lugs. When the device is in working position, the tongues are rotated in relation to the runways 6 and 7 on the pins to a position indicated by the solid lines, and when the device is in idle position, said tongues are at a position in relation to the runways 6 and 7, as shown by the dotted lines 84, the extreme rearward ends of said tongues forming stops which limit the varying positions of said runways in relation to said tongues, but at the same time permitting adjustment of same within certain limits so that the runways may rotate to a more folded position when idle, and compensate to a variety of working positions.

The strut 50, is secured to the sleeves 43, by U bolts 85, which are disposed about said sleeves and thru said strut, the nuts 86 being used to draw said strut and sleeves firmly together. It will thus be understood that the sleeves may adjust to different longitudinal positions in accordance with the different spacings between side rails of different chassis constructions, thus rendering same adjustable to different width automobiles.

It is obvious that the lateral confinement of the respective vehicle by the side walls 30 of the runways 7 serves to locate the wheel supported by runway 6 in proper lateral position. The pilot 17 is slidably disposed in the tubing 16 to permit longitudinal adjustment therewith to vary the distance between the runways to conform to the distance between the wheels of the particular vehicle to which the apparatus is applied. A bolt 87 transversely engages said pilot and tubing thru slots 88 in the same, said slots being formed longitudinally with same to permit corresponding adjustment of said pilot in said tubing.

The journals 14 are formed in brackets 89 which attach to the gear casing 28 and housing 13 at points adjacently secured to the runway 6, by which the working position of said runway is stabilized directly by the truck wheels 8 thru the axle 10.

It will be observed from Fig. 1 that the axles 11 are offset with each other to distribute the load carried by the truck wheels 9 at different points on the tubing 16. This arrangement also serves to position the wheels 9 for more extensive clearance with the respective side rail 1 and other parts of the vehicle when the device is in idle position.

The gear worm 18 is meshed with the gear 12 upwardly thereof, the housing 13 closely surrounding said gear at other points, giving a maximum amount of road clearance under said housing, and clearance on the sides of said housing, when the device is in idle position, with the adjacent parts of the various vehicles to which the device is applied.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. In combination with an automobile, a parking mechanism having a truck means which serves to carry the automobile laterally by supporting two of the automobile wheels thereon, said mechanism being in idle position when said wheels are not supported thereon, and in operating position when certain parts thereof are under said wheels, flexible means connecting said mechanism to the automobile, tongue means one end of which is connected to said mechanism, a lock means carried by the automobile, and means on said tongue means which engages said lock means during the idle disposition of said mechanism, and a means on said tongue means which engages said lock means during the operation of said mechanism.

2. In combination with an automobile, a parking mechanism comprising a truck means serving to carry the automobile laterally, by supporting two of the automobile wheels thereon, said mechanism being then in operating position and having an idle position in which said wheels are not supported thereon, flexible means connected said mechanism to the automobile, tongue means one end of which is connected to said mechanism and the other end of which is provided with a slide means, a guide means serving to guide said slide means when said mechanism is shifted from idle to working position, a locking means connected with said guide means, means on said tongue means which engages said locking means during the idle disposition of said mechanism, and a means on said tongue means which engages said locking means during the operation of said mechanism.

3. An automobile parking mechanism having truck means serving to carry certain of the automobile wheels laterally, said mechanism having an idle position, and an operating position under said wheels, a flexible strand means serving to bring said mechanism in the idle position, lock means serving to lock said mechanism in idle position, and a trigger and keeper means serving to unlock said lock means and release said mechanism from idle position as desired.

4. A parking mechanism having a truck means serving to carry an automobile laterally, by first running two of the automobile wheels on parts of said truck means, said mechanism being in idle position when said two wheels do not rest on any part of same and being in operating position when certain parts thereof are under said wheels, tongue means connected to said mechanism, guide means serving to guide said tongue means, a lock connected with said mechanism, a slide and guide means serving to confine said tongues laterally, a slidable plunger serving to engage each of said tongues, sleeves serving to guide said plungers, and a strut adjustably secured to said guides by which they may be installed at different distances apart to conform to the different widths of different automobiles with which the mechanism is embodied.

5. A parking mechanism having a truck means serving to carry an automobile laterally by first running two of the automobile wheels on parts of said truck means, said mechanism being in idle position when said two wheels do not rest on any part of same and being in operating position when certain parts thereof are under said wheels, tongue means connected to said mechanism, guide means serving to guide said tongue means, a lock means connected with said guide means, means on said tongue means which engages said lock means during the idle disposition of said mechanism, and a means on said tongue means which engages the same lock means during the operation of said mechanism.

JOHN H. MOFFAT.